United States Patent [19]

Koleske et al.

[11] Patent Number: 4,680,361

[45] Date of Patent: Jul. 14, 1987

[54] NOVEL POLYMERS AND CROSSLINKED COMPOSITIONS MADE THEREFROM

[75] Inventors: Joseph V. Koleske, Charleston, W. Va.; Donald F. Smith, Bridgewater; Robert J. Weber, Neshanic, both of N.J.

[73] Assignee: Union Carbide Corporation, Danbury, Conn.

[21] Appl. No.: 831,199

[22] Filed: Feb. 20, 1986

[51] Int. Cl.$^4$ .............................................. C08F 20/64
[52] U.S. Cl. .................................. 526/318; 525/329.5
[58] Field of Search ...................... 526/318; 525/329.5

[56] References Cited

U.S. PATENT DOCUMENTS

| | | | |
|---|---|---|---|
| 4,126,527 | 11/1978 | Kaufman | 204/159.22 |
| 4,188,472 | 2/1980 | Chang | 528/75 |
| 4,525,258 | 6/1985 | Watanabe et al. | 204/159.23 |
| 4,574,130 | 3/1986 | Potter | 526/318 |

*Primary Examiner*—Paul R. Michl
*Attorney, Agent, or Firm*—J. B. Mauro

[57] ABSTRACT

This invention is directed in general to polymers (including oligomers) that contain carboxyl-terminated lactone acrylates, to a process for their preparation, and to coating, ink, adhesive, and sealant compositions (including the cured coatings, inks, adhesives, and sealants) that are obtained by crosslinking the above compositions by various means. The cured compositions, which are, for example, high-quality industrial finishes, are made by incorporation of various conventional crosslinking agents and other normally-used formulating ingredients with the polymeric compositions of the invention.

25 Claims, No Drawings

NOVEL POLYMERS AND CROSSLINKED COMPOSITIONS MADE THEREFROM

DESCRIPTION OF THE PRIOR ART

In the field of coating technology, efforts have been made and are presently being made to alter the various properties of coatings so they will have improved performance characteristics and, for example, provide improved corrosion resistance or other protection, aesthetic appeal, electrical resistance, etc., or a combination of such properties. Improvements in solvent resistance, adhesion, flexibility, hardness, impact resistance of an optimization of such properties is always highly desirable and makes the coatings more suitable for use as appliance finishes, automobile finishes, wood finishes, business machine finishes, house siding finishes, transportation finishes, general metal finishes, and the like.

It is known that the inclusion of epsilon-caprolactone and other lactones in coating compositions improves flexibility of the final coatings. For example, U.S. Pat. No. Re. 30,234 describes the reaction of epsilon-caprolactone with a copolymer of, e.g., styrene and 2-hydroxyethyl acrylate, and thereafter with a crosslinking agent, e.g., melamine formaldehyde, to give a crosslinked, modified copolymer having desirable flexibility, hardness, and chemical durability.

The polymeric compositions and processes of the present invention utilize novel compositions containing a reactive monomer derived from the reaction product of a hydroxyalkyl acrylate or methacrylate and a lactone, such as epsilon-caprolactone, that is subsequently reacted with an anhydride, such as maleic anhydride or phthalic anhydride, to produce a material having reactive carboxyl groups and hydroxyl groups, and which can polymerize with other ethylenically unsaturated monomers and thereafter can be crosslinked to give polymeric coating, adhesive, ink or sealant compositions having a highly desirable combination of flexibility and hardness in addition to excellent adhesiveness, solvent resistance, hydrolytic stability, and chemical compatibility. Such reactive monomers derived from the reaction of a hydroxyalkyl acrylate or methacrylate and a lactone, such as epsilon-caprolactone, are described more fully in U.S. patent application Ser. No. 438,496, filed on Nov. 2, 1982, now abandoned, and in copending U.S. patent application Ser. No. 565,530, filed Dec. 29, 1983, now abandoned.

U.S. Pat. No. 4,504,635, entitled "Process for the Preparation of Polymeric Compositions", describes a process for the polymerization of a reactive monomer derived from the reaction product of a hydroxyalkyl acrylate or methacrylate and a lactone with other ethylenically unsaturated monomers. The polymeric compositions of this invention were combined with conventional crosslinking agents, plus other normally used formulating ingredients, and made into coatings. The acrylic and styrene/acrylic coatings of this patent, while generally useful, were deficient for some end uses with respect to hardness, with all but one coating composition having a pencil hardness of less than H. This one coating had an H hardness.

SUMMARY OF THE INVENTION

The present invention is directed to crosslinked compositions comprising one or more prepolymers obtained by polymerizing, to a molecular weight of about 300 to about 150,000, one or more ethylenically unsaturated monomers with a composition comprising:

(a) 0 to 10 weight percent, preferably 0 to 5 weight percent, of a lactone;

(b) 0 to about 10 weight percent of hydroxyethyl acrylate or methacrylate;

(c) 0 to about 2 weight percent, preferably 1 or less weight percent, of one or more diacrylates;

(d) 0 to about 10 weight percent, preferably 5 or less weight percent, of products resulting from Michael addition, acrylate polymerization, transesterification reactions, or other side reactions;

(e) 0 to about 50 weight percent, preferably 0 to about 20 weight percent, of a reactive monomer of the following average formula:

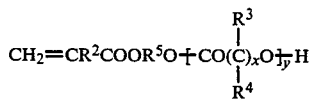

wherein $R^5$ is a divalent radical, $R^2$ is either hydrogen or methyl, each of $R^3$ and $R^4$ is hydrogen, phenyl, or lower alkyl having 1 to about 6 carbon atoms, x is an integer having a value of up to about 10, and y is an integer having a value up to about 20;

(f) 0 to 20 weight percent, preferably less than 10 weight percent, of the reaction product of hydroxyethyl acrylate or methacrylate and an anhydride; and (g) remainder to 100 weight percent of a reactive monomer of the following average formula:

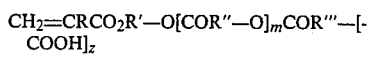

wherein R is H, methyl or ethyl, R' is an alkylene radical having 2 to about 12 carbons, R" is an alkylene radical having about 1 to about 10 carbons, R''' is a divalent radical having 2 to about 20 carbons, m is an integer having a value of 1 to about 20, preferably 1 to about 10, most preferably 1 to 5, and z is an integer having a value of 1 to about 4, preferably 1 to 2.

The prepolymers of this invention are typically soluble in common organic solvents, and, at relatively high molecular weights, are thermoplastic in nature. They are particularly useful in coatings formulations, wherein they are combined with various crosslinking agents and additives known to the art, and are capable of controlled crosslinking, making them useful in coatings, inks, adhesives, and sealants.

As used herein, the terms "polymeric," "polymer" and "prepolymer" are intended to include oligomers. It will be understood by those skilled in the art that the above compositions can be advantageously controlled in molecular weight, and will produce a high molecular weight polymer in the absence of any factor which would terminate the reaction short of completion. On the other hand, it is also within the scope of this invention to produce the above compositions in relatively low molecular weight form, as by appropriate control of reaction conditions, addition of a chain transfer or terminating agent, and the like. Such lower molecular weight polymers are particularly suitable in coatings formulations which are to be cross-linked, as by reaction with, e.g., melamines. When so used, the polymers of this invention desirably have a molecular weight range of about 300 to about 150,000, preferably about 500 to about 50,000, and most preferably about 1,000 to about 10,000.

In addition, the invention is directed to curable compositions comprising one or more ethylenically unsaturated monomers in combination with items (a)–(g), above, further in combination with a free radical-generating catalyst, and optionally further in combination with an effective amount of a chain-terminating or chain-transfer agent.

The invention is further directed to a process for preparing polymeric compositions comprising polymerizing the above compositions in the presence of a catalyst.

The invention is further directed to a process for preparing a crosslinked polymeric coating composition comprising: (1) polymerizing one or more ethylenically unsaturated monomer in combination with items (a)–(g), above, and (2) crosslinking the polymeric composition of (1) with an (a) isocyanate resin, or (b) with an amino resin selected from the group consisting of melamine formaldehydes, urea formaldehydes, and benzoguanamine formaldehydes, or (c) with an epoxide resin which is preferably a cycloaliphatic epoxide resin.

The compositions of this invention in their liquid form exhibit highly desirable stability and chemical compatibility, and in their cured form, as in coatings, they exhibit solvent resistance, and hardness in combination with toughness. The polymeric compositions and the crosslinked polymeric coating compositions prepared by the above-described processes are also part of this invention.

DETAILED DESCRIPTION

The novel compositions containing a reactive monomer derived from the reaction of an anhydride with the reaction product of a hydroxyalkyl acrylate, methacrylate or ethacrylate and a lactone utilized in the polymeric compositions in this invention. In the present invention these novel compositions will be termed "carboxyl-terminated lactone acrylates." The carboxyl-terminated lactone acrylates are prepared as follows:

The lactone acrylate and anhydride or carboxylic acid compound are combined and allowed to react at temperatures of from room temperature to about 180° C. for periods of time ranging from less than an hour to several days, with the length of reaction time depending on the temperature employed. Both time and temperature will depend on the particular reactants used. The preferred reaction temperatures are from about 40° C. to 160° C. for less than an hour to about twenty-four hours, and the most preferred reaction temperatures are from about 60° C. to 140° C. for less than an hour to about eight hours. The reaction is carried out in an oxygen-containing atmosphere which may be produced by blanketing the reactants with air, sparging the reactants with air, or by any other means that will introduce oxygen and inhibit reaction of the acrylate functionality. Although the reaction proceeds without an added catalyst, in certain instances it may be desirable to add a catalyst to promote the reaction and minimize the reaction time. Suitable catalysts are alkaline compounds such as tetramethylammonium bromide, trimethylbenzyl ammonium hydroxide, trimethylbenzylammonium ethoxide, trimethylbenzyl ammonium bromide and other quaternary ammonium compounds. It is desirable to add an inhibitor or free radical stabilizer to the reacting system to prevent gelation when oxygen alone is not sufficient for this purpose. A variety of quinones such as hydroquinone monomethyl ether, hydroquinone, alkyl- and aryl-substituted hydroquinone, p-methyoxyphenol, and so on, can be used as free radical stabilizers. These inhibitors can be used in concentrations of from about 100 to 2000 ppm, preferably from 200 to 700 ppm, of the reactants. In many instances, the starting lactone acrylate will contain one or more of these inhibitors. If desired, an inert solvent or a reactive solvent can be used in the preparation of the carboxyl-terminated lactone acrylates. Inert solvents are such materials as toluene, 1,1,1-trichloroethane, ethoxyethanol acetate, and the like, and reactive solvents are various compounds such as 2-ethyl hexyl acrylate, 1,6-hexanediol diacrylate, trimethylolpropanetriacrylate, and the like.

The amount of polycarboxylic acid anhydride to be reacted with the caprolactone acrylate can be an amount sufficient to react with all of the hydroxyl groups; however, it may be desirable to use an amount of anhydride which is insufficient to react with all of the hydroxyl groups present in the caprolactone acrylate. This amount will vary and can be from about 0.1 to one anhydride equivalent or anhydride moiety for each hydroxyl equivalent or group present in the caprolactone acrylate, preferably from about 0.4 to one anhydride equivalent or anhydride moiety for each hydroxyl group present in the caprolactone acrylate, and more preferably from about 0.6 to one anhydride equivalent or anhydride moiety for each hydroxyl group. In a most preferred instance, one anhydride equivalent or anhydride moiety is charged for each hydroxyl equivalent or group initially present in the reaction mixture.

If desired, carboxylic acids can be reacted with the caprolactone acrylate via a condensation mechanism to yield monofunctional or polyfunctional compounds or mixtures thereof. These polyfunctional compounds can have single or multiple acrylate functionality and/or single or multiple carboxyl functionality. Specifically, when polyfunctional carboxylic acids are used, the resulting compound can have mono or multiple acrylate functionality and/or mono or multicarboxyl functionality. When monofunctional carboxylic acids or anhydrides, such as acetic anhydride, are used, the product will be an ester- or substituted ester-terminated molecule. However, the preferred reactant is an anhydride, which provides for more facile reaction conditions.

In another embodiment, the carboxyl-terminated lactone acrylates can be reacted with a variety of mono- or polyhydric alcohols to form the corresponding esters, which are useful as flexibilizers for coating, ink, adhesive and sealant formulations, in other uses that require acrylates, such as oligomers and polymers, and as high-boiling solvents. A variety of alcohols can be used, as for example, methanol, which would yield the methyl ester of the lactone acrylate, ethanol, which would yield the ethyl ester of the lactone acrylate, propanol, iso-propanol, n-butanol, s-butanol, i-butanol, t-butanol, and so on. Useful polyhydric alcohols would include glucose, sucrose, glycerol, sorbitol, inositol, and so on.

In addition, the lactone acrylate can be reacted with acetic anhydride to form the methyl ester of the lactone acrylate or it can be reacted with various monocarboxylic acids to form a variety of esters. Although such esters are not acid-terminated, they are useful as acrylates in the preparation of polymers or oligomers useful as flexibilizers.

While a preferred embodiment of the carboxyl-terminated lactone acrylates contains two molecules of caprolactone, on the average, per acrylate group, useful products can have from one to twenty or more caprolactone units per acrylate group, or can be a mixture of compounds that contain from one to about twenty or more lactone units. In addition, these units could be other lactones such as beta-propiolactone, delta-valerolactone, delta-butyrolactone, zeta-enantholactone, eta-caprylolactone, and so on, or substituted lactones such as 6-methyl-epsilon-caprolactone, 3-methyl-epsilon-caprolactone, 5-methyl-epsilon-caprolactone, 5-phenyl-epsilon caprolactone, 4-methyl-delta-valerolactone, 3,5-dimethyl-epsilon caprolactone, and so on, or copolymers of such lactones, such as a copolymer of epsilon-caprolactone and epsilon-methyl-epsilon caprolactone, of epsilon caprolactone and eta-caprolactone, of delta-valerolactone and epsilon-methyl-epsilon caprolactone, and so on. In addition, combinations of lactones and oxides such as ethylene oxide, propylene oxide, butylene oxide, and so on, can be used to make the "lactone acrylate" compounds. Of course, when desired, the lactone acrylate can be prepared from one or more lactones alone or in combination with one or more of the described oxides. In an embodiment of the invention, the lactone acrylate can be prepared by reacting a hydroxyalkyl acrylate and a mixture of caprolactone, diacid—such as adipic acid, and diol—such as 1,6-hexane diol. Also useful in place of, or in addition to, diols are polyols, such as triols, tetrols, and so on. If desired, one or more oxides can be included in the reaction mixture. Further types of lactone acrylate will be those described above that have been end-capped with one or more moles of an alkylene oxide or of a tetrahydrofuran. For example, caprolactone acrylate

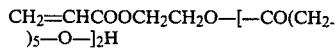

can be reacted with n molecules of ethylene oxide to produce the following molecule

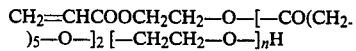

where n has a value of one to about ten or more. This oxide-capped molecule can be reacted with an anhydride to produce the molecules of this invention. If desired, before reacting the oxide-capped caprolactone acrylate with an anhydride, it could be further reacted with a lactone to form a block copolymer with alternating blocks that are the same or different in composition. Finally, the copolymeric acrylate would be reacted with an anhydride to produce the molecules of this invention.

Although a variety of lactones can be used, the preferred lactones to be used in the preparation of the caprolactone acrylates are epsilon-caprolactone and substituted epsilon-caprolactone. The most preferred lactone is epsilon-caprolactone.

The hydroxyalkyl acrylates that can be used to produce the lactone acrylate are 2-hydroxyethyl, 2-hydroxypropyl, 2-hydroxybutyl, 3-hydroxypropyl acrylate or methacrylate, diethylene glycol monoacrylate or monomethacrylate, glycerine or trimethylolpropane mono- or diacrylate or mono- or dimethacrylate, pentaerythritol mono-, di-, or triacrylate or mono-, di-, or trimethacrylate, glucose or sorbitol mono-, di-, tri-, tetra-, and penta-acrylate, or mono-, di-, tri-, tetra-, and pentamethacrylate, and the like. If desired, mixtures of one or more of these acrylates can be used in preparing the lactone acrylate of this invention.

Cyclic anhydrides of carboxylic acids are preferred for reaction with the lactone acrylates. However, if desired, mono- and polyfunctional carboxylic acids may be used wherein a condensation mechanism is employed. Anhydrides are preferred. Among the various anhydrides that can be used for the practice of this invention are maleic anhydride, succinic anhydride, phthalic anhydride, hexahydrophthalic anhydride, methyl tetrahydrophthalic anhydride, glutaric anhydride, cis- and trans-1,2-cyclohexane dicarboxylic anhydride, citraconic anhydride, itaconic anhydride, dodecenyl anhydride, isophthalic anhydride, hexachlorophthalic anhydride, chlorendic anhydride, trimellitic anhydride, pyromellitic anhydride, benzophenone dicarboxylic acid anhydride, naphthoic anhydride, norbornene dicarboxylic acid anhydride, acetic anhydride, or any other intramolecular anhydride including those having one or more anhydride groups and those having substituents thereon such as halogen atoms, alkyl, alkoxy, or aromatic groups, nitro, carboxyl, aryl, or any other group that will not unduly interfere with the reaction. In addition, when desired, mixtures of one or more anhydrides and/or carboxylic acids can be used. When the products of this invention are prepared, from about 0.1 to about one equivalent of anhydride can be used per equivalent of hydroxyl and it is preferred to use about 0.4 to about one equivalent of anhydride per equivalent of hydroxyl, and it is most preferred to use from 0.6 to one equivalent of anhydride per equivalent of hydroxyl. In a most preferred instance, one anhydride equivalent or anhydride moiety is charged for each hydroxyl equivalent or group initially present in the reaction mixture.

Illustrative of the monofunctional carboxylic acid compounds that can be used, one can name pentanoic acid, hexanoic acid, octanoic acid, caprylic acid, capric acid, hendecanoic acid, lauric acid, tridecanoic acid, pentadecanoic acid, stearic acid, arachidic acid, behenic acid, benzoic acid, cerotic acid, 2-ethylhexanoic acid, naphthoic acid, myristic acid, palmitic acid, oleic acid, linoleic acid, linolenic acid, oleostearic acid, levulinic acid, ricinoleic acid, hexanoic acid, cinnamic acid, and the like, and mixtures of such acids.

Illustrative of the polyfunctional carboxylic acids that can be used, one can mention oxalic acid, malonic acid, succinic acid, glutaric acid, adipic acid, suberic acid, azelaic acid, sebacic acid, brassylic acid, maleic acid, fumaric acid, itaconic acid, phthalic acid, isophthalic acid, terephthalic acid, trimellitic acid, tartaric acid, maleic acid, mannaric acid, 1,4-cyclohexanedicarboxylic acid, 1,2-cyclohexanedicarboxylic acid, 1,4,5,6,7,7-hexachloro-5-norbornene-2,3-dicarboxylic acid, hexahydophthalic acid, galactaric acid, 4,5-cyclohexenedicarboxylic acid, 3,6-methylene-4-cyclohexene-1,2-dicarboxylic acid, citric acid, and the like, as well as mixtures of these acids and mixtures of these acids with monocarboxylic acids. The carboxylic acids can be unsubstituted or they can be substituted with any group which will not significantly interfere with the reaction. Illustrative of suitable substituents are the halogens, nitro, alkoxy, alkyl, keto, and the like.

The anhydride-capped lactone acrylates of this invention can be used in many ways. These ways of utilizing the compounds include homopolymerization or copolymerization with a variety of other suitable acrylates, methacrylates, or other ethylenically unsaturated compounds that will undergo copolymerization by radiation reaction techniques. Suitable compounds for copolymerization include methyl, ethyl, propyl, isopropyl, butyl, isobutyl, secondary-butyl, tertiary-butyl, pentyl, neopentyl, isopentyl, hexyl, ethyl-hexyl, dodecyl, glycidyl, hydroxyalkyl, and so on, acrylates and methacrylates, acrylic and methacrylic acid, 2-polystyrylalkylmethacrylates as 2-polystyrylethylmethacrylate (Arco Chemical Co., Chemlink 4500), vinyl compounds such as vinyl acetate, vinyl chloride, styrene, acrylonitrile, methacrylonitrile, and the like, 1,6-hexanediol diacrylate, trimethylolpropane di- and triacrylate and methacrylate, pentaerythritol di-, tri-, and tetraacrylate, diethylene glycol diacrylate, esterdiol diacrylates, alkoxylated esterdiol diacrylates, caprolactone acrylates or methacrylates wherein caprolactone polyols (that are elsewhere described as in U.S. Pat. No. 3,169,945, for example) are esterified with acrylic or methacrylic acid, alkoxylated derivatives (i.e., end-capped) of the above-described caprolactone polyols that are esterified with acrylic or methacrylic acid, alkylene oxide polyols or monols that have been esterified with acrylic or methacrylic acid, reaction products of alkylene oxides with monols or polyols such as hydroxyalkyl acrylates or trimethylol propane, pentaerythritol, sorbitol, glucose, etc., that have been esterified with acrylic or methacrylic acid, poly(tetramethylene oxide) polyols that have been esterified with acrylic acid or methacrylic acid, epoxy acrylates, urethane acrylates, and the like.

The polymeric (including oligomeric) compositions and the crosslinked polymeric coating compositions of this invention can be prepared by conventional polymerization techniques in which the novel carboxyl-terminated acetone acrylate (or mixture of them) is blended with one or more ethylenically unsaturated monomers, polymerization catalysts, and, if desired, chain transfer agents, and polymerized by any one of a variety of polymerization techniques including bulk polymerization, solution polymerization, emulsion polymerization, aqueous or nonaqueous dispersion polymerization, and the like. The polymerizations can be carried out at temperatures of from about 60° C. to about 200° C. for periods of time of from about two hours to about 10 hours or more. The polymerization is preferably carried out in solution using a solvent in which the oligomeric or polymeric product is soluble. Solvents which can be used in the solution polymerization include, for example, methyl n-amyl ketone, methyl i-butyl ketone, methyl ethyl ketone, butyl alcohol, toluene, 2-ethoxyethyl acetate, butyl acetate, dioxane, toluene, xylene, isopropanol, and the like, as well as mixtures of these solvents.

Suitable polymerization catalysts include, for example, azo-bis-isobutyronitrile, lauroyl peroxide, benzoyl peroxide, t-butyl hydroperoxide, acetyl cyclohexane sulfonyl peroxide, diisobutyl peroxide, t-butyl perbenzoate, diisopropyl peroxydicarbonate, azo-bis-(2-methyl proprionitrile), and the like.

Suitable chain-transfer agents include t-dodecylmercaptan, and the like.

The oligomeric and polymeric products can also be prepared by any of the known emulsion polymerization, suspension polymerization, or bulk polymerization processes.

Suitable ethylenically unsaturated monomers which can be employed in this invention include, among others, the esters of acrylic or methacrylic acid and monohydric alcohols, hydroxyl-functional acrylic monomers, alpha, beta-ethylenically unsaturated carboxylic acids, vinyl hydrocarbons, and the like. The hydroxyl-functional acrylic monomers can include 2-hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, hydroxyhexyl methacrylate, glycerine mono- or diacrylate, glycerine mono- or dimethacrylate, lactone acrylates, as for example TONE ® Monomer M-100 (available from Union Carbide Corp.), and the like. Suitable esters of acrylic or methacrylic acid and monohydric alcohols include, among others, ethyl acrylate, n-butyl acrylate, i-butyl acrylate s-butyl acrylate, t-butyl acrylate, propyl acrylate, 2-ethylhexyl acrylate, methyl acrylate, hexyl acrylate, cyclohexyl acrylate, decyl acrylate, and the like, as well as the methacrylates of these compounds. Suitable alpha, beta-ethylenically unsaturated carboxylic acids include, among others, acrylic acid, methacrylic acid, itaconic acid, crotonic acid, and the like. Suitable vinyl hydrocarbons include, for example, styrene, alpha-methyl styrene, vinyl toluene, vinyl cyclohexane, t-butyl styrene, p-methyl styrene, chlorstyrene, vinyl acetate, maleic anhydride, allyl alcohol, and the like. The preferred vinyl hydrocarbon is styrene. Other monomers, such as acrylonitrile, vinylidine chloride, methacrylonitrile, vinyl chloride, and the like, can be included in the compositions of this invention.

The concentration of the carboxyl-terminated lactone acrylate or acrylates in the compositions of this invention can range from about 1 to about 100 weight percent, preferably from about 1 to about 60 weight percent, and most preferably from about 3 to about 40 weight percent. The concentration of the other ethylenically-unsaturated monomers in the compositions of this invention can range from about 0 to 99 weight percent, preferably from 40 to 99 weight percent, and most preferably from about 60 to 97 weight percent. Included in the compositions of this invention are the homopolymers of the carboxyl-terminated lactone acrylates and the copolymers made from mixtures of various carboxyl-terminated lactone acrylates. The number average molecular weight of the polymeric compositions of this invention can range from 300 or less to about 500,000 or greater; however, a more generally useful upper range would be in the area of about 150,000.

The compositions of the present invention utilize carboxyl-terminated lactone acrylates in novel reactive polymeric compositions which are prepared by reaction with themselves and or with other ethylenically unsaturated monomers by addition polymerization. Neither the lactone nor the carboxy group is grafted onto the polymeric backbone. It is believed that utilization of the carboxyl-terminated lactone acrylates in such polymeric compositions results in a unique distribution of lactone and carboxyl groups along the polymer backbone. In addition, utilization of the carboxyl-terminated lactone acrylates results in carboxyl groups that are uniquely far removed from the polymer backbone, thus making them more accessible for reaction with crosslinking agents, for catalysis, for pigment or filler dispersion, and the like.

The crosslinkable compositions of this invention will contain one or more compounds capable of reacting with the carboxyl and/or hydroxyl groups available, thereby effecting crosslinking. Suitable compounds are, for instance, an epoxide resin, an amino resin, an isocyanate resin, a carbodiimide resin, or a combination of such compounds. The epoxide resins include, for example, novolac epoxides, glycidyl ethers of various types, including diglycidyl ethers of Bisphenol-A, diglycidyl ethers of butanediol, and the like, cycloaliphatic epoxides, such as cyclohexene oxide, cyclohexene diepoxide, vinyl cyclohexene mono- and diepoxide, limonene mono- and diepoxide, and other cycloaliphatic epoxides known to those skilled in the art such as are described in U.S. Pat. Nos. 3,027,357; 2,890,194; 2,890,197, 3,117,009; 3,031,434; 3,125,592; and 3,201,360. Of particular interest is that portion of U.S. Pat. No. 3,027,357 beginning at column 4, line 11 to column 7, line 38, and that portion of U.S. Pat. No. 3,201,360 beginning at column 2, line 60 to column 4, line 43, which portions are incorporated herein by reference. Among the specific illustrative epoxides disclosed therein one can mention as particularly appropriate 3,4-epoxycyclohexylmethyl-3,4-epoxycyclohexane carboxylate, bis-(3,4-epoxy-cyclohexylmethyl)adipate, vinylcyclohexene diepoxide, bis(2,3-epoxycyclopenyl)ether, epoxidized butadiene, epoxidized soybean oil, epoxidized linseed oil, methyl epoxy linseedate, epoxidized talates, butyl epoxy soyate, octyl epoxy linseedate, and the like. A preferred cycloaliphatic epoxide is 3,4-epoxycyclohexylmethyl-3,4-epoxycyclohexane carboxylate. The concentration of the epoxide resin in the polymeric coating composition can range from about 5 or less to about 90 or more, preferably about 10 or less to about 75 or more, weight percent of the total weight of the coating composition.

The amino resin crosslinking agents are preferably formaldehyde derivatives, such as melamine formaldehydes, urea formaldehydes, and benzoquanamine formaldehydes. A melamine formaldehyde resin, such as hexamethoxymethyl melamine, is preferred. Butylated melamine formaldehydes can also be used. The concentration of the amino resin in the polymeric coating compositions of this invention can range from about 10 or less to about 60 or more weight percent or more preferably from about 10 or less to about 50 or more, percent, of the total weight of the coating composition.

In certain instances, a catalyst may be desired to improve the efficiency of the epoxide, amino resin, or isocyanate crosslinking reaction during curing into coatings, adhesives, or sealants. The concentration of catalyst can vary from zero to about 10 weight percent, preferably from about 0.05 to about 5 weight percent, based on the total weight of the coating composition. The particular catalyst used and its concentration are dependent, to a degree, on its catalytic activity and the specific components present in the coating composition. These catalysts are known to those skilled in the art and include sulfuric acid, hydrochloric acid, p-toluene sulfonic acid, methyl sulfonic acid, phosphoric acid and alkyl derivatives of phosphoric acid, maleic acid, trimellitic acid, triflic acid, salts of triflic acid such as the diethylammonium salt of triflic acid, the ammonium salt of triflic acid, stannous salt of triflic acid, stannous octanoate, uranyl nitrate, zinc octanoate, and the like. In certain instances, mixtures of these catalysts may be desirable.

The crosslinkable polymeric coating compositions can also contain pigments, fillers, surfactants, flow and leveling agents, and other additives conventionally present in coating compositions in their conventional quantities. Selection of particular ones is considered to be within the skill of the art. In preparing the crosslinkable polymeric coating compositions, the ingredients are mixed by the conventional procedures used in the production of paints, inks, adhesive, and sealant compositions. These procedures are so well known to those skilled in the art that they do not require further discussion here.

The crosslinkable polymeric coating compositions are applied to a surface or substrate by conventional means and then thermally cured by heating at a temperature of about 50° C. to about 375° C., preferably from about 90° to about 200° C., for a period of time sufficient to obtain a dry film. Generally this time will range from about one minute to about two hours. The components present in a particular crosslinkable polymeric coating composition will determine the temperature and time that will be required to obtain an adequate cure and a good coating film.

The crosslinkable polymeric compositions of this invention can be high solids coating compositions and they can contain as much as 90 weight percent or more solids. Generally, the total solids content of the coatings compositions of this invention ranges from about 20 weight percent or less to about 90 weight percent or more, preferably from about 40 to about 90 weight percent, of the total weight of the coating composition.

The coating compositions of this invention can contain various additives that are known to those skilled in the art. Such additives include, pigments, colorants, dyes, defoamers, thickeners, preservatives, mildew inhibitors, anti-sag agents, anti-settling agents, and the like.

The invention is further described in the examples which follow. All parts and percentages are by weight unless otherwise specified.

In the examples which follow, the cured coating compositions were evaluated according to the following procedures:

Forward Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the coating side of the coated steel panel. The inches times pounds, designated inch-pounds, absorbed by the film without rupturing was recorded as the film's forward impact resistance.

Pencil Hardness (ASTM D-3363-74): pencil leads of increasing hardness values were forced against the film coating surface in a precisely defined manner until one pencil lead cut through the surface of the film coating. The surface hardness was considered as the hardest pencil grade which just failed to cut through the film coating surface. The pencil leads, in order of softest to hardest, were reported as follows: 6B, 5B, 4B, 3B, 2B, B, HB, F, H, 2H, 3H, 4H, 5H, 6H, 7H, 8H, and 9H.

Solvent Resistance: a measure of the resistance of the cured film to attack by acetone and was reported as the number of rubs or cycles of acetone-soaked cheesecloth required to remove one-half of a cured film from the test area. This test was performed by stroking the cured film with acetone-soaked cheesecloth until that amount of film coating was removed. The number of cycles required to remove this amount of coating was a measure of the coating's solvent resistance.

Reverse Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the film's reverse impact resistance.

Crosshatch Adhesion: a lattice pattern with either six or eleven cuts in each direction was made in the coating film to the substrate and pressure-sensitive adhesive tape was applied over the lattice pattern and then removed. The adhesion was evaluated by comparison with descriptions and illustrations, as more fully detailed in ASTM D-3359-78.

EXAMPLES

The following examples illustrate, but in no way limit, the invention. All percentages are by weight.

GLOSSARY OF MATERIALS USED IN EXAMPLES

1. TONE Monomer M-100. A caprolactone acrylate with an average molecular weight of about 344 and marketed by Union Carbide Corp.
2. CYMEL 303. An alkylated amino crosslinking agent of the melamine type marketed by American Cyanamide Co.
3. CYCAL 4040. An acid catalyst marketed by American Cyanamide Co.
4. ERL-4221. 3,4-epoxycyclohexylmethyl-3,4-epoxycyclohexane carboxylate marketed by Union Carbide Corp.
5. FC-520. A triflic acid salt catalyst marketed by 3M Co.
6. L-7610. A silicone/alkylene oxide copolymer marketed by Union Carbide Corp.

EXAMPLE 1

An acid-terminated caprolactone acrylate was prepared by combining 688 grams of TONE monomer M-100 caprolactone acrylate monomer and 266.4 grams of phthalic anhydride in a 1000 cc, four-neck, glass reaction flask that was equipped with a stirrer, thermometer, air inlet and air outlet. These ingredients were heated to 120° C. while stirring and sparging the system with air. When 120° C. was reached, the reactants exhibited an exotherm to 135° C. The reaction mass was cooled to 120° C. and held there for one hour. The air sparge was maintained throughout the reaction period. After this time, the product was cooled to room temperature and stored for further use. It had a viscosity of 1270 cp at 25° C.

EXAMPLE 2

An acrylic resin with pendant carboxylic acid functinality was prepared in the following manner. A monomer mixture was prepared from the following ingredients.

| Example 1 Product | 194 g |
|---|---|
| Styrene | 139 g |
| Butyl acrylate | 173 g |
| Acrylic acid | 14.4 g |

An initiator and chain-transfer agent mixture was prepared by dissolving 7.0 grams of VAZO 52 (azo-based polymerization initiator sold by Du Pont) in 22 g of methyl isobutyl ketone and adding 12.0 of t-dodecyl-mercaptan (chain transfer agent). The monomer mixture and the initiator/chain transfer agent mixture was combined to produce the polymerization mixture used in the following procedure.

A one-liter, three neck round bottom flask was fitted with a mechanical stirrer, condenser, nitrogen inlet and outlet, and a monomer addition tube. The flask was charged with 61 grams of methyl isobutyl ketone and heated to reflux (more or less 115° C.). The above-described polymerization mixture was added dropwise to the refluxing methyl isobutyl ketone over a period of three hours with a mechanical pump while maintaining the contents of the flask at approximately 115° C. After all of the polymerization mixture had been added, the temperature was lowered to 80° C. and 1.0 g of VAZO 52 dissolved in 9.0 g methyl isobutyl ketone was added over a period of 15 minutes and this mixture was maintained at 80° C. for one hour. The resulting polymer solution was cooled to 40° C and discharged to a storage container for further use. Total solids of this solution was determined to be 77.18 percent by heating a sample of the solution for one hour at 150° C.

An acrylic resin containing both carboxylic acid functionality and hydroxyl functionality was prepared in a manner identical to that described in Example 2, except that the following monomer mixture was used.

| Example 1 Product | 87.7 g |
|---|---|
| M-100 | 194 g |
| Styrene | 139 g |
| Butyl acrylate | 173 g |

Total solids of the solution was determined to be 83.13% by heating a sample of the solution at 150° C. for one hour.

EXAMPLE 4

The following ingredients were combined, well mixed, and coated onto Bonderite 100 steel panels at four mils thickness.

| Example 3 Product | 111.6 g |
|---|---|
| Cymel 303 | 33.0 g |
| Cycat 4040 | 1.0 g |
| Butanol | 5.0 g |
| Methyl-isobutyl-ketone | 20.0 g |

The coated panels were allowed to dry under ambient conditions for 20 minutes to partially remove solvents, and then they were placed in a 150° C. oven for 20 minutes to effect the crosslinking reaction. The coated panels were then cooled to room temperature and stored for testing. The cured coating had a pencil hardness of 2H and a Gardner impact resistance of 68 in. lbs. in the forward direction and of 108 in. lbs. in the reverse direction.

EXAMPLE 5

The following ingredients were combined, well mixed, coated, and cured as described in Example 4 except, that the cure temperature was 122° C. instead of 150° C.

| Example 2 Product | 108.2 g |
|---|---|
| ERL-4221 | 47.0 g |
| Stannous Octoate | 1.5 g |

-continued

| Methyl-isobutyl-ketone | 23 g |

The cured coating had a pencil hardness of F and Gardner impact resistance of 56 in. lbs. in the forward direction and of 68 in. lbs. in the reverse direction.

EXAMPLE 6

A 250 milliliter, three-neck round bottom flask was fitted with a mechanical stirrer, condenser, nitrogen inlet and outlet, and a monomer addition tube. The flask was charged with 35 grams of methyl isobutyl ketone, and was heated to reflux. The following polymerization mixture was added dropwise to the refluxing solvent over a period of about one hour.

| Example 1 Product | 50 g |
| VAZO 52 | 0.5 g |
| t-dodecylmercaptan | 1.0 g |
| Methyl isobutyl ketone | 10 g |

After all of the polymerization mixture had been added, the temperature was lowered to 80° C and 0.2 g VAZO 52 dissolved in 5.0 grams of methyl isobutyl ketone were added to the reaction mixture in a dropwise manner, and this mixture was maintained at 80° C. for 30 minutes. The reaction mass was cooled, discharged to a storage container, and stored.

EXAMPLES 7–12

The ingredients shown in Table I are placed in a glass container, well mixed, and coated onto Bonderite 37 steel panels with a #20 wire-wound rod.

TABLE I

| Ingredients, g | Example | | | | | |
| --- | --- | --- | --- | --- | --- | --- |
| | 7 | 8 | 9 | 10 | 11 | 12 |
| Example 2 Product* | | | 129.57 | | | |
| ERL-4221 | 36.5 | 61.0 | 85.0 | 61.0 | 61.0 | 61.0 |
| FC-520 | 0.68 | 0.81 | 0.93 | 0.81 | 0.81 | 0.81 |
| L-7610 | 0.68 | 0.81 | 0.93 | 0.81 | 0.81 | 0.81 |
| Methyl amyl ketone | | | | 69.0 | | |
| 1,1,1-Trichloroethane | | | | | 69.0 | |
| Methoxypropyl acetate | | | | | | 69.0 |

*77.18% total solids by weight in methyl amyl ketone.

EXAMPLE 13

An acid-terminated caprolactone acrylate was prepared by combining 37.0 g of phthalic anhydride, 19.25 g of hexahydrophthalic anhydride, and 129.0 g of TONE Monomer M-100 in a glass, four-neck reaction flask equipped with a stirrer, a thermometer, an air inlet and an air outlet, and heating them at 125° C. for 3.5 hours. The product was recovered and found to have an Acid Number of 114 and a viscosity of 1690 cp when measured at 25° C.

EXAMPLE 14

An acrylic resin with pendant carboxylic acid functionality is prepared in the following manner. A monomer mixture is made by blending the following ingredients:

| Example 13 Product | 100 g |
| Styrene | 70 g |

-continued

| t-Butyl acrylate | 87 g |

An initiator and chain transfer agent mixture is prepared by dissolving 3.5 grams of VAZO 52 in 11 grams of methyl amyl ketone and adding 6.0 grams of t-dodecylmercaptan. The monomer mixture and initiator/chain-transfer agent mixture are combined to form a polymerization mixture that is used in the same procedure as that used in Example 2, except that 35 grams of methyl amyl ketone are present in the reaction flask and this is heated to its reflux temperature. In addition, when the temperature is decreased to 80° C., 0.5 gram of VAZO 52 dissolved in a 5 grams of methyl amyl ketone are added. The product, a viscous but pourable amber fluid, was recovered and stored.

EXAMPLES 14 to 19

Coating compositions, the same as those of Examples 7 to 12 except that bis-(3,4-epoxycyclohexyl methyl) adipate is used instead of ERL-4221, are prepared, applied to steel substrate, and cured. The coating exhibits excellent hardness and impact strength.

EXAMPLE 20

An acrylic resin with pendant carboxylic acid functionality is prepared in the following manner: A monomer mixture is made by blending the following ingredients:

| Example 1 Product | 5 g |
| Hydroxyethyl acrylate | 20 g |
| Acrylonitrile | 60 g |
| Butyl acrylate | 70 g |

An initiator and chain-transfer-agent mixture is prepared by dissolving 2.0 grams of VAZO 52 in 7 grams of ethoxyethyl acetate and adding 3.5 grams of t-dodecylmercaptan. The monomer mixture and initiator/chain-transfer agent mixture are combined to form a polymerization mixture that is used as described in Example 2, except that 25 grams of ethoxyethyl acetate are present in the reaction flask. When the temperature is decreased to 80° C., 0.3 gram of VAZO 52 dissolved in 3.0 grams of methyl amyl ketone are added. The product, a viscous but pourable amber fluid, is recovered and stored.

We claim:

1. A crosslinked composition comprising one or more prepolymers obtained by polymerizing, to a molecular weight of about 300 to about 150,000, one or more ethylenically unsaturated monomers with a composition comprising:
   (a) 0 to 10 weight percent of a lactone;
   (b) 0 to about 10 weight percent cf hydroxyethyl acrylate or methacrylate;
   (c) 0 to about 2 weight percent of one or more diacrylates;
   (d) 0 to about 10 weight percent of products resulting from Michael addition, acrylate polymerization, transesterification reactions, or other side reactions;
   (e) 0 to about 50 weight percent of a reactive monomer of the following average formula:

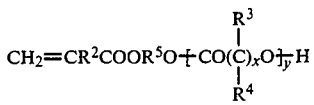

wherein $R^5$ is a divalent radical, $R^2$ is either hydrogen or methyl, each of $R_3$ and $R_4$ is hydrogen, phenyl, or lower alkyl having 1 to about 6 carbon atoms, x is an integer having a value of up to about 10, and y is an integer having a value up to about 20;
  (f) 0 to 20 weight percent, of the reaction product of hydroxyethyl acrylate or methacrylate and an anhydride; and
  (g) remainder to 100 weight percent of a reactive monomer of the following average formula:

wherein R is H, methyl or ethyl, R' is an alkylene radical having 2 to about 12 carbons, R" is an alkylene radical having about 1 to about 10 carbons, R'" is a divalent radical having 2 to about 20 carbons, m is an integer having a value of 1 to about 20, and z is an integer having a value of 1 to about 4;
and reacting said prepolymer or prepolymers with one or more crosslinking compounds capable of reacting with carboxyl and/or hydroxyl groups.

2. A crosslinked composition of claim 1 wherein the molecular weight of the prepolymer is about 500 to about 50,000.

3. A crosslinked composition of claim 2 wherein the molecuar weight of the prepolymer is about 1,000 to about 10,000.

4. A crosslinked composition of claim 1 wherein the prepolymer comprises a homopolymer of reactive monomer (g).

5. A crosslinked composition of claim 1 wherein the prepolymer comprises a copolymer of reactive monomers (e) and (g).

6. A crosslinked composition of claim 1 wherein lactone (a) is 0 to about 5 weight percent, diacrylates (c) are 0 to about 1 weight percent, products (d) are 0 to about 5 weight percent, monomer (e) is about 0 to about 20 weight percent, and reaction product (f) is 0 to about 10 weight percent.

7. A crosslinked composition of claim 1 wherein m is 1 to about 10 and z is 1 to 2.

8. A crosslinked composition of claim 1 wherein the crosslinking compound is an amino resin.

9. A crosslinked composition of claim 8 wherein the crosslinking compound is a melamine formaldehyde resin.

10. A crosslinked composition of claim 1 wherein R is H, R' is ethylene, R" is pentylene and R'" is —CH=CH—, and z is 1.

11. A crosslinked composition claimed in claim 1 wherein R is CH₃—, R' is ethylene, R" is pentylene, and R'" is —CH=CH—, and z is 1.

12. A crosslinked composition of claim 2 wherein R'" is phenylene.

13. A crosslinked composition claimed in claim 1 wherein R is H, R' is ethylene, R" is 1-methyl-pentylene, and R'" is —CH=CH—, and z is 1.

14. A crosslinked composition claimed in claim 1 wherein R is H, R' is ethylene, R" is a mixture of pentylene and 1-methyl-pentylene, R'" is —CH=CH—, and z is 1.

15. A crosslinked composition claimed in claim 1 wherein R is H, R' is ethylene, R" is octylene, and R'" is —CH=CH—, and z is 1.

16. A crosslinked composition claimed in claim 10 wherein R'" is cyclohexylene.

17. A crosslinked composition claimed in claim 10 wherein R'" is methyl tetrahydrophenylene.

18. A crosslinked composition claimed in claim 10 wherein R'" is —CH₂C(=CH₂)—.

19. A crosslinked claimed in claim 1 wherein reactive monomer (g) has the structure:

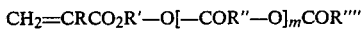

wherein R is H, or methyl or ethyl, R' is an alkylene radical having 2 to about 12 carbons, R" is an alkylene radical having about 1 to about 10 carbons, R'''' is a monovalent hydrocarbon radical having about 2 to about 20 carbons and m is an integer having a value of 1 to about 20.

20. A crosslinkable composition comprising one or more prepolymers obtained by polymerizing, to a molecular weight of about 300 to about 150,000, one or more ethylenically unsaturated monomers with a composition comprising:
  (a) 0 to 10 weight percent of a lactone;
  (b) 0 to about 10 weight percent of hydroxyethyl acrylate or methacrylate;
  (c) 0 to about 2 weight percent of one or more diacrylates;
  (d) 0 to about 10 weight percent of products resulting from Michael addition, acrylate polymerization, transesterification reactions, or other side reactions;
  (e) 0 to about 50 weight percent of a reactive monomer of the following average formula:

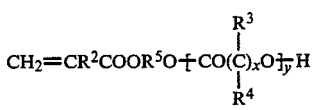

wherein $R^5$ is a divalent radical, $R^2$ is either hydrogen or methyl, each of $R^3$ and $R^4$ is hydrogen, phenyl, or lower alkyl having 1 to about 6 carbon atoms, x is an integer having a value of up to about 10, and y is an integer having a value up to about 20;
  (f) 0 to 20 weight percent, of the reaction product of hydroxyethyl acrylate or methacrylate and an anhydride; and
  (g) remainder to 100 weight percent of a reactive monomer of the following average formula:

wherein R is H, methyl or ethyl, R' is an alkylene radical having 2 to about 12 carbons, R" is an alkylene radical having about 1 to about 10 carbons, R'" is a divalent radical having 2 to about 20 carbons, m is an integer having a value of 1 to about 20, and z is an integer having a value of 1 to about 4;
one or more crosslinking compounds capable of reacting with carboxyl and/or hydroxyl groups; optionally, a crosslinking catalyst.

21. Method for preparing a crosslinkable composition comprising preparing one or more prepolymers by polymerizing one or more ethylenically unsaturated monomers with a composition comprising:
(a) 0 to 10 weight percent of a lactone;
(b) 0 to about 10 weight percent of hydroxyethyl acrylate or methacrylate;
(c) 0 to about 2 weight percent of one or more diacrylates;
(d) 0 to about 10 weight percent of products resulting from Michael addition, acrylate polymerization, transesterification reactions, or other side reactions;
(e) 0 to about 50 weight percent of a reactive monomer of the following average formula:

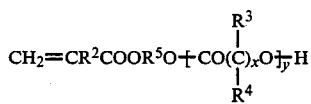

wherein $R^5$ is a divalent radical, $R^2$ is either hydrogen or methyl, each of $R^3$ and $R^4$ is hydrogen, phenyl, or lower alkyl having 1 to about 6 carbon atoms, x is an integer having a value of up to about 10, and y is an integer having a value up to about 20;

(f) 0 to 20 weight percent, of the reaction product of hydroxyethyl acrylate or methacrylate and an anhydride; and
(g) remainder to 100 weight percent of a reactive monomer of the following average formula:

wherein R is H, methyl or ethyl, R' is an alkylene radical having 2 to about 12 carbons, R" is an alkylene radical having about 1 to about 10 carbons, R''' is a divalent radical having 2 to about 20 carbons, m is an integer having a value of 1 to about 20, and z is an integer having a value of 1 to about 4; and contacting said prepolymer or prepolymers with one or more crosslinking compounds capable of reacting with carboxyl and/or hydroxyl groups, optionally in the presence of a crosslinking catalyst.

22. Method of claim 21 wherein the prepolymer or prepolymers are prepared in the presence of a chain-transfer agent.

23. Method of claim 22 wherein the chain-transfer agent is t-dodecylmercaptan.

24. A coating comprising a crosslinked composition of claim 1.

25. An article coated with a crosslinked composition of claim 1.

* * * * *